(12) United States Patent
Arakawa et al.

(10) Patent No.: US 10,668,896 B2
(45) Date of Patent: Jun. 2, 2020

(54) CAR SHARING SYSTEM AND CAR SHARING METHOD

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Masahiro Arakawa, Aichi (JP); Masahiko Oya, Aichi (JP); Masaki Oshima, Aichi (JP); Masaki Hayashi, Aichi (JP); Yuichiro Haruna, Oyama (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/018,193

(22) Filed: Jun. 26, 2018

(65) Prior Publication Data
US 2019/0001926 A1    Jan. 3, 2019

(30) Foreign Application Priority Data
Jun. 29, 2017    (JP) .................................. 2017-127587

(51) Int. Cl.
*B60R 25/24*    (2013.01)
*G07C 9/00*    (2020.01)
*G06Q 10/02*    (2012.01)

(52) U.S. Cl.
CPC ......... *B60R 25/241* (2013.01); *G06Q 10/025* (2013.01); *G07C 9/00023* (2013.01);
(Continued)

(58) Field of Classification Search
CPC ........................... B60R 25/24; G07C 9/00309
(Continued)

(56) References Cited

U.S. PATENT DOCUMENTS

| | | | | |
|---|---|---|---|---|
| 2007/0248231 A1* | 10/2007 | Kasahara | ............ | G06F 12/1416 380/277 |
| 2011/0140839 A1* | 6/2011 | DiSalvo | ................ | B60R 25/245 340/5.61 |

(Continued)

FOREIGN PATENT DOCUMENTS

| | | | |
|---|---|---|---|
| JP | 2011-044112 A | 3/2011 | |
| JP | 2012-229560 A | 11/2012 | |

(Continued)

*Primary Examiner* — Fabricio R Murillo Garcia
(74) *Attorney, Agent, or Firm* — Greenblum & Bernstein, P.L.C.

(57) ABSTRACT

A car sharing system includes a car sharing device. The car sharing device includes a key function unit and a user authentication function unit. The key function unit allows a device of a vehicle that is shared with multiple people to operate by performing ID verification through a process similar to an electronic key of the vehicle. When the device of the vehicle is operated with a mobile terminal, the user authentication function unit obtains key information from an external device via the mobile terminal and performs authentication of the key information. When authentication of the key information is accomplished and use of the vehicle is within a reservation time, the user authentication function unit validates the key function unit. The key information is generated as information that is permitted only a temporary use.

14 Claims, 11 Drawing Sheets

(52) U.S. Cl.
CPC ...... *G07C 9/00119* (2013.01); *G07C 9/00309* (2013.01); *G07C 9/00571* (2013.01); *B60R 2325/205* (2013.01); *G07C 2009/0042* (2013.01); *G07C 2009/00793* (2013.01); *G07C 2209/08* (2013.01)

(58) Field of Classification Search
USPC ........................................................ 340/5.72
See application file for complete search history.

(56) References Cited

U.S. PATENT DOCUMENTS

| | | | |
|---|---|---|---|
| 2014/0232524 A1* | 8/2014 | Nakai | B60R 25/24 340/5.61 |
| 2014/0266594 A1* | 9/2014 | Reiser | B60R 25/24 340/5.72 |
| 2014/0277837 A1* | 9/2014 | Hatton | B60R 25/24 701/2 |
| 2016/0055691 A1* | 2/2016 | Jeong | G07C 9/00007 340/5.61 |
| 2017/0186251 A1* | 6/2017 | Lee | G07C 9/00007 |
| 2017/0278329 A1 | 9/2017 | Konishi | |

FOREIGN PATENT DOCUMENTS

| | | |
|---|---|---|
| JP | 2013-257653 A | 12/2013 |
| JP | 2016-071834 | 5/2016 |
| JP | 2016-115077 | 6/2016 |
| JP | 2016-208494 A | 12/2016 |

\* cited by examiner

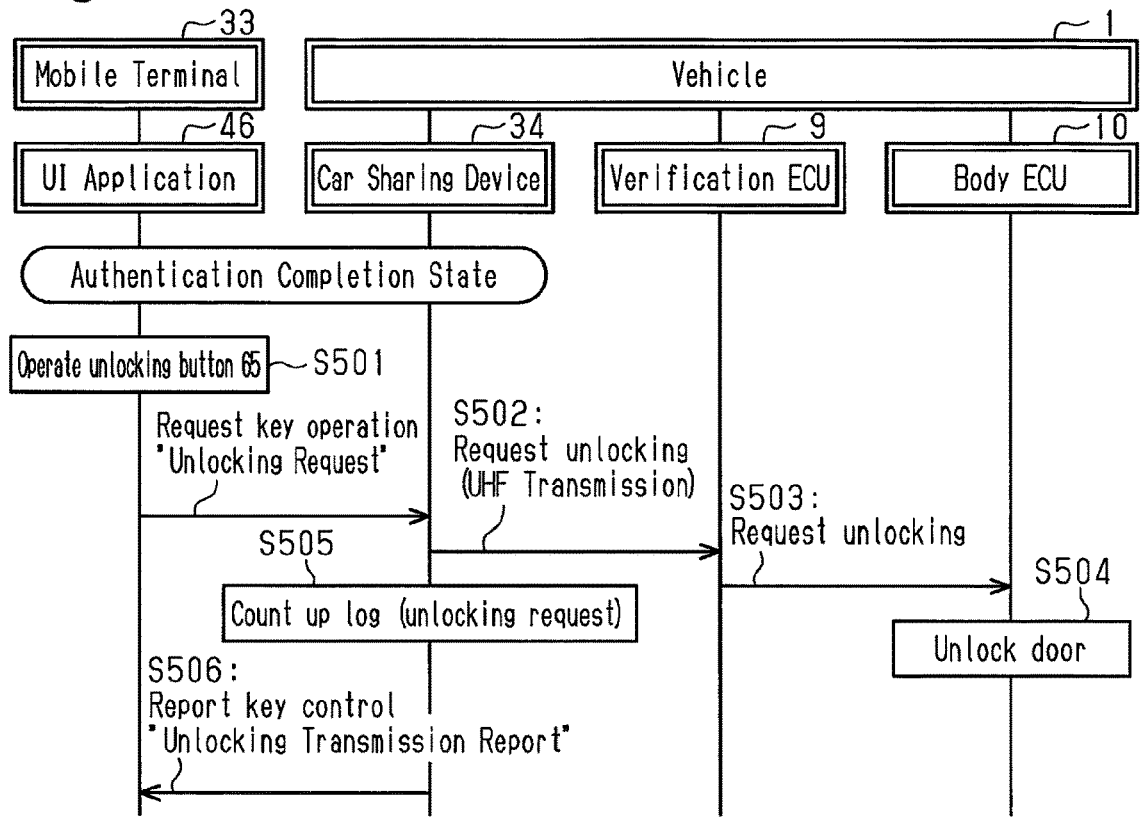
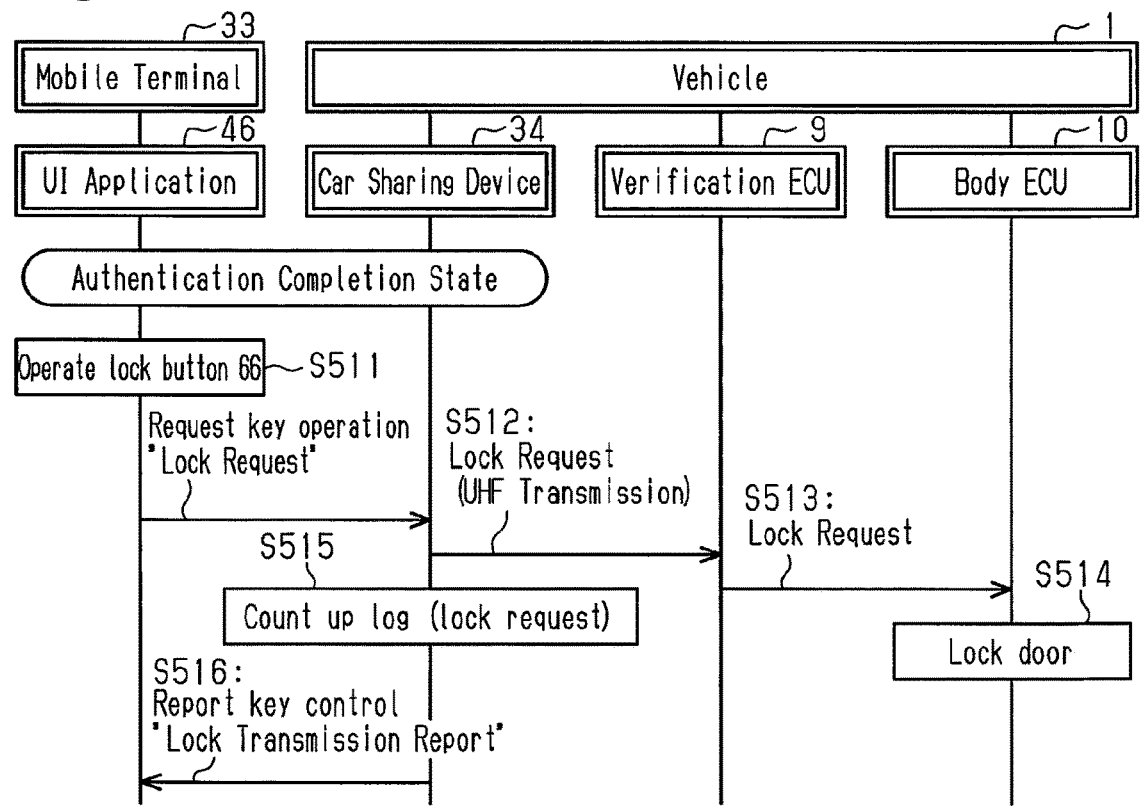

CAR SHARING SYSTEM AND CAR SHARING METHOD

CROSS-REFERENCE TO RELATED APPLICATIONS

This application is based upon and claims the benefit of priority from prior Japanese Patent Application No. 2017-127587, filed on Jun. 29, 2017, the entire contents of which are incorporated herein by reference.

FIELD

This disclosure relates to a car sharing system and a car sharing method in which a vehicle is shared with multiple people.

BACKGROUND

A car sharing system in which a vehicle is shared with multiple people is known in the prior art (refer to Japanese Laid-Open Patent Publication Nos. 2016-115077 and 2016-71834). In this type of car sharing system, for example, the use of car sharing is registered in a server or the like in advance. Then, when a vehicle is reserved with, for example, a mobile terminal (e.g., smartphone), the use of the vehicle is permitted within a reservation time.

SUMMARY

In this type of car sharing system, a mobile terminal is generally used to reserve a vehicle on a server, and the server transmits reservation information to the vehicle. In this configuration, the vehicle needs to include a device that communicates with the server. This may complicate the configuration of the vehicle. Additionally, in a configuration in which when a vehicle is rented, a reader/writer device reads a membership card, which is, for example, an IC card carried by the user, the vehicle needs to include the reader/writer device. This may also complicate the configuration of the vehicle.

Further, for example, when a vehicle key is operated to start the engine of a vehicle, the vehicle key may be kept, for example, in the glove compartment in the vehicle. In this case, since the vehicle key is located in the passenger compartment, theft of the vehicle key may result in an unauthorized use of the vehicle. This is undesirable in the viewpoint of security.

One embodiment is a car sharing system that includes a car sharing device. The car sharing device includes a key function unit and a user authentication function unit. The key function unit allows a device of a vehicle that is shared with multiple people to operate by performing ID verification through a process similar to an electronic key of the vehicle. When the device of the vehicle is operated with a mobile terminal, the user authentication function unit obtains key information from an external device via the mobile terminal and performs authentication of the key information. When authentication of the key information is accomplished and use of the vehicle is within a reservation time, the user authentication function unit validates the key function unit. The key information is generated as information that is permitted only a temporary use.

Another embodiment is a car sharing method. The method includes providing key information that is permitted only a temporary use to a mobile terminal from an external device. The method further includes obtaining the key information from the mobile terminal with a user authentication function unit of a car sharing device included in a vehicle. The method further includes performing authentication of the key information with the user authentication function unit. The method further includes validating a key function unit of the car sharing device when authentication of the key information is accomplished and use of the vehicle is within a reservation time. The method further includes performing ID verification through a process similar to an electronic key of the vehicle with the key function unit and allowing a device of the vehicle to operate when the ID verification performed with the key function unit is accomplished.

Other embodiments and advantages thereof will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which:

FIG. 7 is a flowchart illustrating a sequence of unlocking a vehicle door;

FIG. 8 is a flowchart illustrating a sequence of locking a vehicle door;

DESCRIPTION OF THE EMBODIMENTS

Figure 1:
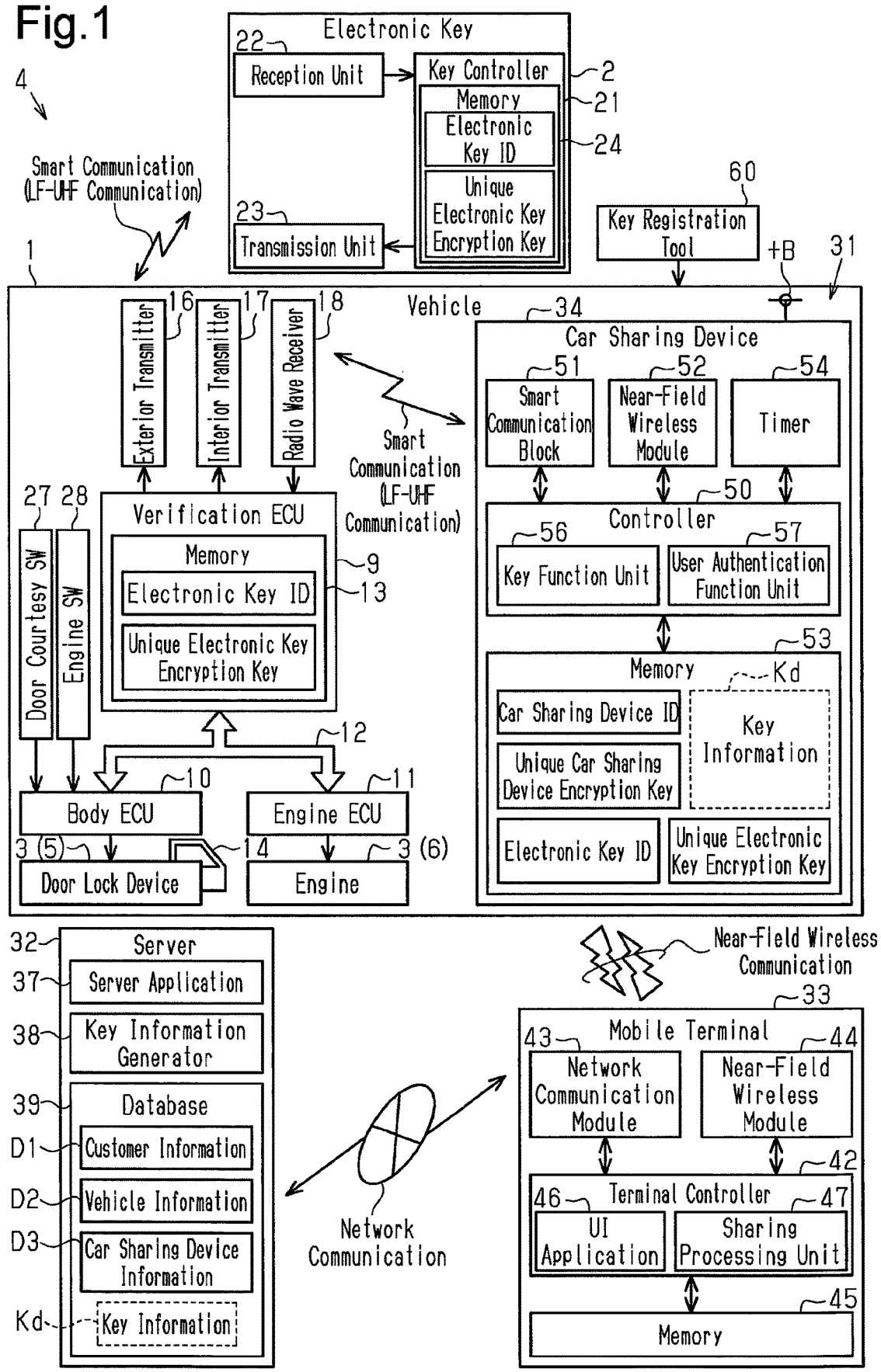
FIG. 1 is a diagram illustrating the configuration of one embodiment of a car sharing system.

Embodiments will now be described with reference to the accompanying drawings. Elements in the drawings may be partially enlarged for simplicity and clarity and thus have not necessarily been drawn to scale.

One embodiment of a car sharing system and a car sharing method will now be described with reference to FIGS. 1 to 13.

As illustrated in FIG. 1, a vehicle 1 includes an electronic key system 4 that performs ID verification through wireless communication with an electronic key 2 and executes or permits actuation of a device 3 of the vehicle 1. The electronic key system 4 is a key operation free system that performs ID verification through short range wireless communication triggered by communication from the vehicle 1. In the key operation free system, ID verification (smart verification) is automatically performed without a direct operation of the electronic key 2. The device 3 includes, for example, a door lock device 5 and an engine 6.

The vehicle 1 includes a verification electronic control unit (ECU) 9 as a verification unit that performs ID verification. The vehicle 1 further includes a body ECU 10 that controls power supply of on-board electric components and an engine ECU 11 that controls the engine 6. The ECUs 9 to 11 are electrically connected to each other by a communication line 12 located in the vehicle. The communication line 12 is, for example, a controller area network (CAN) or a local interconnect network (LIN). The verification ECU 9 includes a memory 13, in which an electronic key ID that is unique to the electronic key 2 of the vehicle 1 is registered. The body ECU 10 controls the door lock device 5, which changes a vehicle door 14 between a locked state and an unlocked state.

The vehicle 1 includes an exterior transmitter 16 capable of transmitting radio waves out of the passenger compartment, an interior transmitter 17 capable of transmitting radio waves into the passenger compartment, and a radio wave receiver 18 capable of receiving radio waves in the vehicle 1. The exterior transmitter 16 and the interior transmitter 17 transmit radio waves in a low frequency (LF) band. The radio wave receiver 18 receives radio waves in an ultra high frequency (UHF) band. In the electronic key system 4 of the present example, LF-UHF bidirectional communication is performed.

The electronic key 2 includes a key controller 21 that controls actuation of the electronic key 2, a reception unit 22 that receives radio waves in the electronic key 2, and a transmission unit 23 that transmits radio waves from the electronic key 2. The reception unit 22 is capable of receiving LF radio waves. The transmission unit 23 is capable of transmitting UHF radio waves. The key controller 21 includes a memory 24, in which the electronic key ID of the electronic key 2 is registered.

When the vehicle is parked, the exterior transmitter 16 transmits a wake signal using a LF radio wave. When entering the communication area of the wake signal, the electronic key 2 is activated from a standby state in response to the wake signal. The verification ECU 9 starts ID verification, which is referred to as smart verification (in this case, exterior smart verification), through communication (short range wireless communication) with the activated electronic key 2. The smart verification includes electronic key ID verification that determines whether or not the electronic key ID is valid and challenge-response authentication that uses an encryption key unique to the electronic key 2 (hereinafter, referred to as "a unique electronic key encryption key"). When the electronic key ID verification and challenge-response authentication are accomplished, the verification ECU 9 determines that smart verification is accomplished and executes or permits locking or unlocking of the vehicle door 14 performed by the body ECU 10.

The verification ECU 9 detects entrance of a user to the vehicle from, for example, a door courtesy switch 27. When the entrance of the user to the vehicle is detected, the interior transmitter 17 transmits a wake signal instead of the exterior transmitter 16. When the electronic key 2 receives the wake signal, the verification ECU 9 starts ID verification (in this case, interior smart verification) in the same manner as the exterior smart verification. When the verification ECU 9 determines that the interior smart verification is accomplished, the verification ECU 9 permits an operation for shifting the power supply state (e.g., engine starting operation) performed with an engine switch 28 arranged near the driver seat.

The vehicle 1 includes a car sharing system 31 in which the vehicle 1 is shared with multiple people. In the present example, the car sharing system 31 includes a car sharing device 34 installed in the vehicle 1 serving as a shared vehicle. The car sharing device 34 has an encryption key (hereinafter, referred to as "a unique car sharing device encryption key") capable of decrypting key information Kd registered in a mobile terminal 33. When the mobile terminal 33 obtains encrypted key information Kd from an external device and registers the key information Kd in the mobile terminal 33, the mobile terminal 33 is capable of operating as a vehicle key (electronic key) of the vehicle 1. The car sharing device 34 receives the key information Kd from the mobile terminal 33 through wireless communication and performs authentication of the key information Kd. When the authentication of the key information Kd is accomplished, the car sharing device 34 permits the mobile terminal 33 to operate the device 3 (on-board device).

The car sharing device 34 is independent from the hardware configuration of the electronic key system 4 of the vehicle 1 and is retrofitted to the vehicle 1. The car sharing device 34 functions as, for example, an electronic key that is valid within only a reservation time and is treated in the same manner as a spare key. The verification ECU 9 of the electronic key system 4 recognizes that the electronic key appears in or disappears from the vehicle 1 as the electronic key function of the car sharing device 34 is switched to validation and invalidation. The car sharing device 34 is supplied with power from a battery +B of the vehicle 1.

A server 32, which corresponds to as an external device, includes a server application 37 that controls actuation of the car sharing system 31 in the server 32 and a key information generator 38 that generates the key information Kd. The key information generator 38 is functionally realized in the server 32, for example, by one or multiple processors executing the server application 37. For example, when the server 32 receives a reservation from the mobile terminal 33 to use the vehicle 1 through network communication, the key information generator 38 generates the key information Kd. The key information Kd is generated as information that is permitted only a temporary use. For example, the key information Kd is generated as a one-time key that is permitted to be used only one time.

The server 32 includes a database 39 in which various kinds of information needed when the key information Kd is issued are registered. The database 39 stores the key information Kd generated by the key information generator 38, information of customers registered in the car sharing system 31 (customer information D1), information related to the vehicle 1 shared with multiple people (vehicle information D2), and information related to the car sharing device 34 of the vehicle 1 (car sharing device information D3).

The mobile terminal 33 includes a terminal controller 42 that controls actuation of the mobile terminal 33, a network communication module 43 that allows for network communication of the mobile terminal 33, a near-field wireless module 44 that allows for near-field wireless communication of the mobile terminal 33, and a memory 45 in which data is rewritable. Near-field wireless communication is, for example, Bluetooth (registered trademark).

The mobile terminal 33 includes a user interface application 46 that controls actuation of the car sharing system 31 in the mobile terminal 33 and a sharing processing unit 47 that executes a sharing process of the vehicle 1 in the mobile terminal 33. The sharing processing unit 47 is functionally realized, for example, by the terminal controller 42 executing the user interface application 46. The memory 45 of the mobile terminal 33 stores a user authentication key used in encryption communication performed when the device 3 of the vehicle 1 is operated with the mobile terminal 33. The user authentication key may be generated, for example, from a random number, the value of which changes whenever generated. The user authentication key may be registered in the car sharing system 31 in advance. Alternatively, when the vehicle 1 is used, the user authentication key may be generated and registered in a desired member.

The car sharing device 34 includes a controller 50 that controls actuation of the car sharing device 34, a smart communication block 51 that allows for smart communication of the car sharing device 34, a near-field wireless module 52 that allows for near-field wireless communication of the car sharing device 34, a memory 53 in which data is rewritable, and a timer 54 that controls date and time in the car sharing device 34. A car sharing device ID and the unique car sharing device encryption key, which are included in the car sharing device information D3, are registered in the memory 53 in advance. The timer 54 includes, for example, a soft timer.

The car sharing device 34 includes a key function unit 56 and a user authentication function unit 57. In a non-restrictive example, the key function unit 56 and the user authentication function unit 57 are realized as functions of the controller 50 by one or multiple processors executing one or more programs stored in a storage region such as the memory 53. The key function unit 56 performs ID verification (in the present example, smart verification) by communicating with the verification ECU 9 via the smart communication block 51. The key function unit 56 allows the device 3 of the vehicle 1, which is shared with multiple people, to operate by performing ID verification through a process similar to the electronic key 2.

When the device 3 is remotely operated with the mobile terminal 33, the user authentication function unit 57 performs wireless communication with the mobile terminal 33. When the device 3 is operated with the mobile terminal 33, the user authentication function unit 57 obtains the key information Kd from an external device (in the present example, server 32) via the mobile terminal 33 and performs authentication of the key information Kd. When the authentication of the key information Kd is accomplished and the use of the vehicle 1 is within the reservation time, the user authentication function unit 57 validates the key function unit 56.

The operation and advantages of the car sharing system 31 will now be described with reference to FIGS. 2 to 13.

Figure 2:
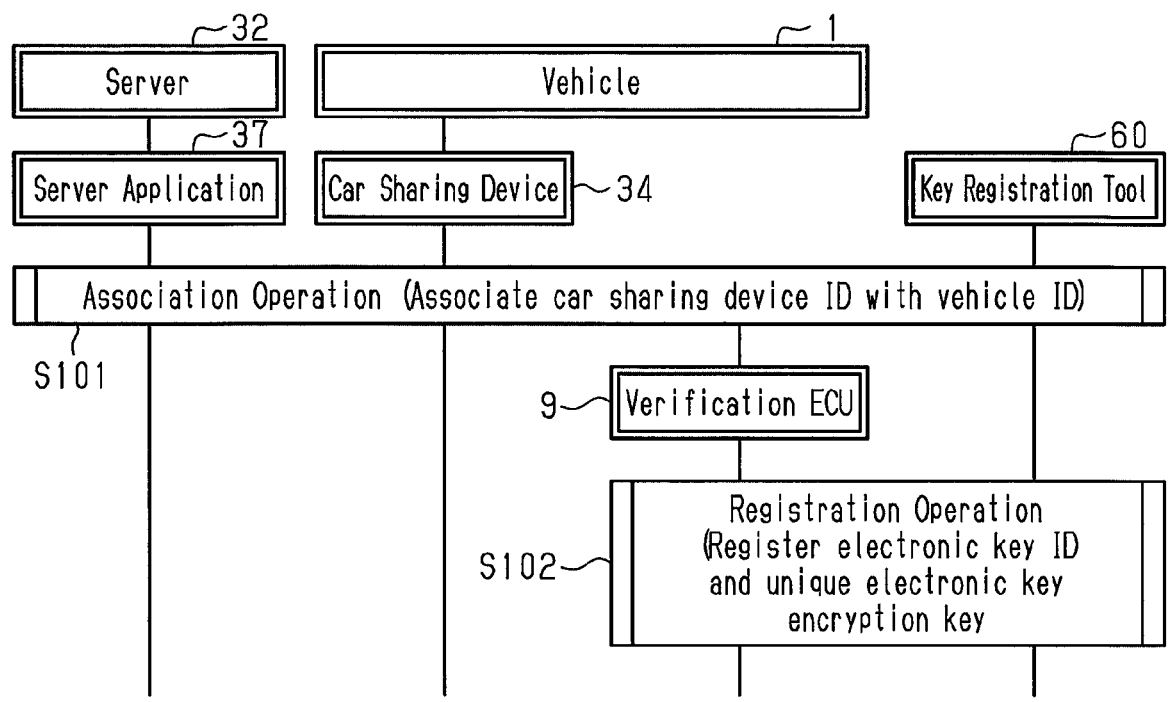
FIG. 2 is a flowchart illustrating a registration process sequence of a car sharing device.

FIG. 2 illustrates the registration process sequence of the car sharing device 34. When the car sharing device 34 is installed in the vehicle 1, the registration process of the car sharing device 34 is performed using a dedicated key registration tool 60. With the key registration tool 60 connected to the vehicle 1, the registration operation is performed to register the car sharing device 34 in the vehicle 1.

In step S101, the car sharing device 34, the server application 37, and the key registration tool 60 start the registration process of the car sharing device 34 triggered by an input of a car sharing device registration request to the key registration tool 60. In the present example, the car sharing device 34, the server application 37, and the key registration tool 60 associate the car sharing device ID, which is given to each car sharing device 34 during manufacturing, with the vehicle ID of the vehicle 1 in which the car sharing device 34 is registered. The vehicle ID is, for example, a vehicle number (for example, numbers on a license plate).

In step S102, the key registration tool 60 performs a registration operation. The registration operation registers the electronic key ID and the unique electronic key encryption key, which are registered in the verification ECU 9, in the car sharing device 34. It is preferred that the registration operation be performed, for example, using an on-board immobilizer system. The immobilizer system determines whether or not the tag (in the present example, car sharing device 34) is valid through, for example, near-field wireless communication such as radio frequency identification (RFID). The immobilizer system is also used when the electronic key 2 is registered in the verification ECU 9.

The registration operation of the car sharing device 34 is performed when the key registration tool 60 is operated to start the registration with the car sharing device 34 held against a near-field wireless antenna (not illustrated) of the immobilizer system of the vehicle 1. In this case, the car sharing device 34 transmits an information obtainment request to the verification ECU 9 through a communication network of the immobilizer system. When the verification ECU 9 receives the information obtainment request from the car sharing device 34, the verification ECU 9 transmits the electronic key ID and the unique electronic key encryption key, which are registered in the verification ECU 9, to the car sharing device 34 through the communication network of the immobilizer system. The car sharing device 34 writes the electronic key ID and the unique electronic key encryption key, which are received from the verification ECU 9, to the memory 53.

Figure 3:
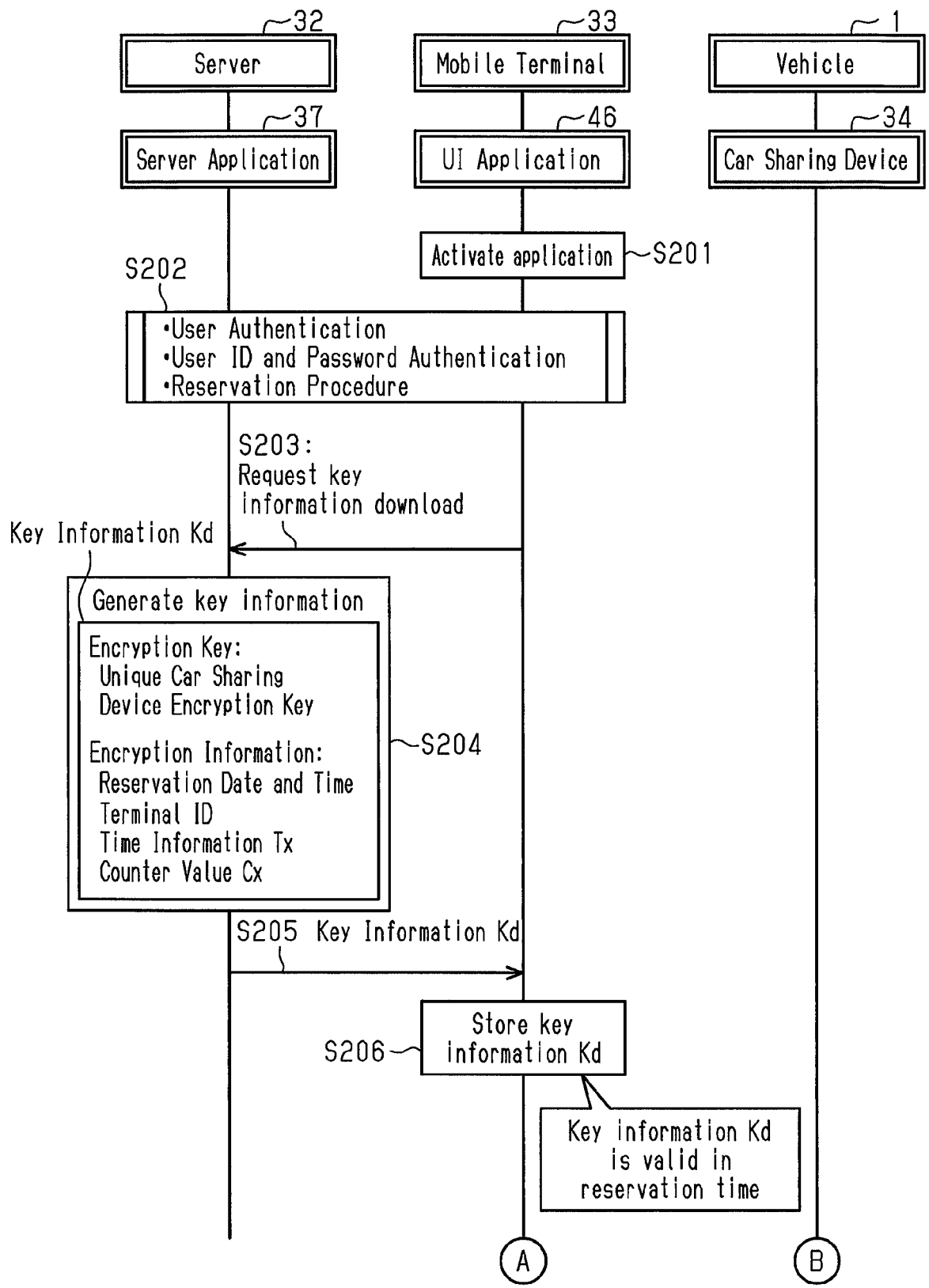
FIG. 3 is a flowchart illustrating a key information authentication sequence.
Figure 4:
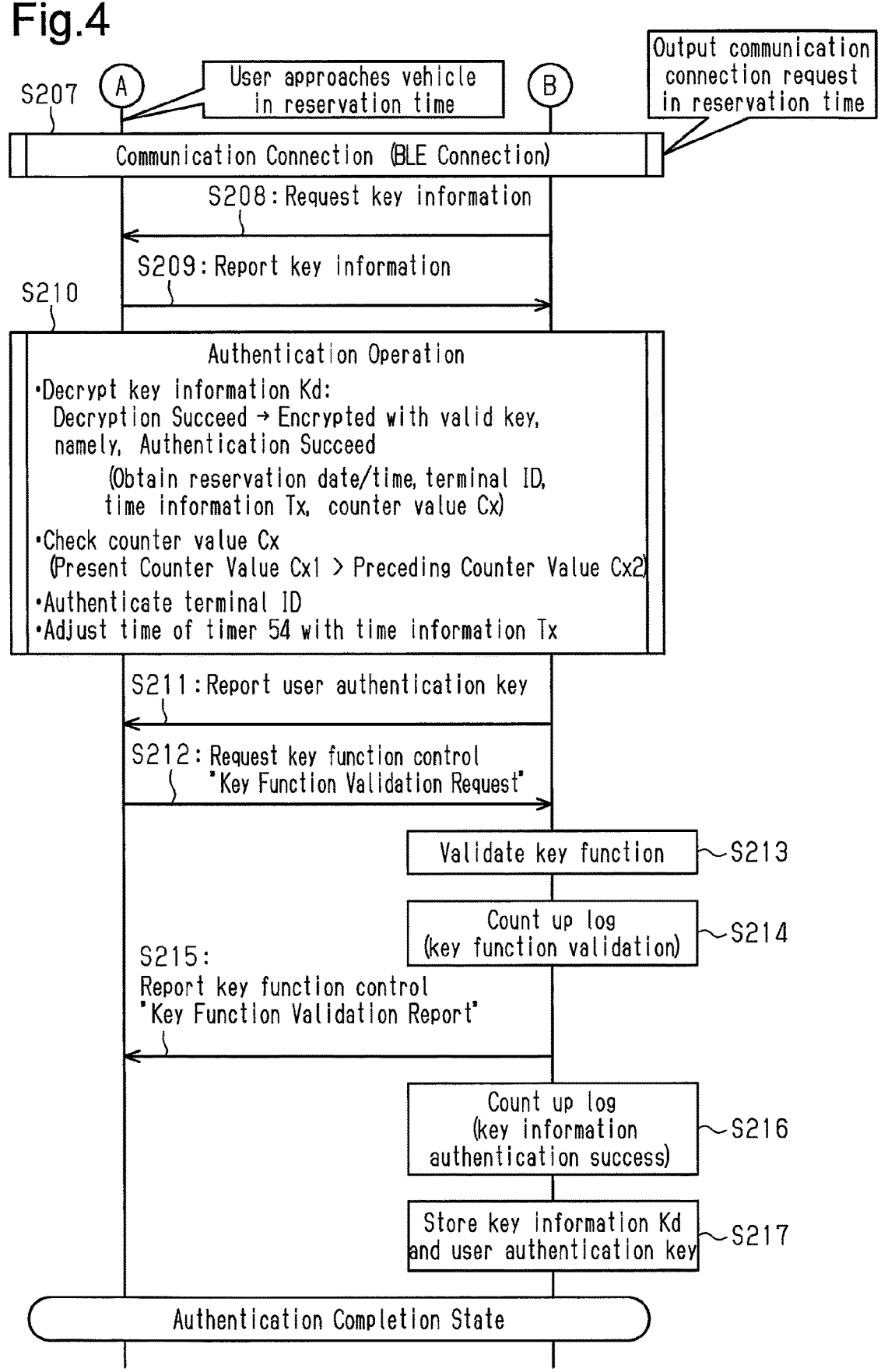
FIG. 4 is a flowchart illustrating the continuation of the key information authentication sequence of FIG. 3.

FIGS. 3 and 4 illustrate the key information authentication sequence. The authentication process of the key information Kd is performed among the vehicle 1, the server 32, and the mobile terminal 33.

In step S201, when the mobile terminal 33 is operated to start the authentication process, the sharing processing unit 47 activates the user interface application 46.

In step S202, the key information generator 38 and the sharing processing unit 47 perform user authentication that checks the user who reserves the vehicle 1. In the user authentication of the present example, a user ID and a password are authenticated, and a reservation procedure is performed to register the vehicle 1 that is wished to be reserved. The user ID is a unique ID assigned to each user during registration to the car sharing system 31. The password includes numbers and letters that are set by the user during the registration to the car sharing system 31. In the authentication of the user ID and password, the user ID and the password are input to the mobile terminal 33 and transmitted to the server 32 through network communication. The key information generator 38 compares the user ID and the password, which are received from the mobile terminal 33, with the customer information D1 in the database 39. When the authentication is accomplished, the process is continued. When the authentication is not accomplished, the process is forcibly terminated.

In the reservation procedure, for example, the vehicle 1 and the date and time that are to be reserved are input. When the input of the reservation is completed, the sharing processing unit 47 transmits the terminal ID unique to the mobile terminal 33 together with various kinds of information such as the reserved vehicle 1 and the reservation date and time to the server 32 through the network communication.

In step S203, when the user authentication (authentication of user ID and password, reservation procedure) is completed, the sharing processing unit 47 transmits a download request of the key information Kd to the server 32 through the network communication.

In step S204, when the key information generator 38 receives the key information download request under a situation in which the user authentication is accomplished, the key information generator 38 generates the key information Kd. At this time, the key information generator 38 identifies the unique car sharing device encryption key of the car sharing device 34 installed in the reserved vehicle 1 from the vehicle information D2 of the reserved vehicle 1 reported from the mobile terminal 33. The unique car sharing device encryption key has a one-to-one relationship with the shared vehicle 1.

The key information generator 38 generates the key information Kd using the unique car sharing device encryption key. In a non-restrictive example, the key information generator 38 obtains a ciphertext, as the key information Kd, generated by combining a plaintext (encryption information), which includes, for example, "reservation date and time," "terminal ID," "time information Tx," and "counter value Cx," with an encryption key, which is "the unique car sharing device encryption key," using an encryption formula (encryption algorithm). As described above, the reservation date and time and the terminal ID are obtained from the mobile terminal 33 in the user authentication process. The time information Tx is used to adjust the time set in the timer 54 and indicates the accurate time controlled by the server 32. The counter value Cx is used to prevent reuse of the key information Kd and is, for example, counted up whenever the key information Kd is generated.

In step S205, the key information generator 38 transmits the generated key information Kd to the mobile terminal 33 through the network communication.

In step S206, the sharing processing unit 47 writes the key information Kd received from the server 32 to the memory 45. The key information Kd is valid within the reservation time.

In step S207 illustrated in FIG. 4, near-field wireless communication is established between the mobile terminal 33 and the car sharing device 34. In a non-restrictive example, the sharing processing unit 47 and the user authentication function unit 57 perform communication connection to establish Bluetooth low energy (BLE) communication. In this case, the user authentication function unit 57 (car sharing device 34) regularly transmits an advertising packet. Here, it is assumed that the user approaches the vehicle 1 within the reservation time. When the sharing processing unit 47 (mobile terminal 33) receives an advertising packet with the time reserved to use the vehicle 1, the sharing processing unit 47 transmits a communication connection request to the car sharing device 34. When the user authentication function unit 57 (car sharing device 34) receives the communication connection request from the mobile terminal 33, the user authentication function unit 57 (car sharing device 34) transmits a communication connection confirmation to the mobile terminal 33 to report the establishment of communication. As a result, BLE communication is established between the mobile terminal 33 and the car sharing device 34.

In step S208, the user authentication function unit 57 transmits a key information request to the mobile terminal 33 to request the key information Kd registered in the mobile terminal 33. The key information request may be defined as a request for starting to use the vehicle 1 (shared vehicle).

In step S209, the sharing processing unit 47 transmits the key information Kd to the car sharing device 34 in response to the key information request. The key information Kd is encrypted by a predetermined encryption key (e.g., unique car sharing device encryption key) registered in the car sharing system 31 and is transmitted to the car sharing device 34. Additionally, the sharing processing unit 47 transmits the terminal ID of the mobile terminal 33 to the car sharing device 34.

In step S210, the sharing processing unit 47 and the user authentication function unit 57 perform an authentication operation using the key information Kd. At this time, the user authentication function unit 57 determines whether or not the key information Kd is successfully decrypted using a predetermined encryption key (e.g., unique car sharing device encryption key) registered in the car sharing system 31. When the decryption of the key information Kd succeeds, the user authentication function unit 57 considers that the key information Kd obtained from the mobile terminal 33 was encrypted with the correct encryption key and determines that the authentication succeeded. When the authentication succeeds, the user authentication function unit 57 obtains "reservation date and time," "terminal ID," "time information Tx," and "counter value Cx" included in the key information Kd. When the authentication does not succeed, the user authentication function unit 57 considers that the key information Kd was encrypted with an incorrect encryption key, determines that the authentication failed, and terminates the connection of BLE communication.

The user authentication function unit 57 checks the counter value Cx obtained in the authentication operation. If a present counter value Cx1 is greater than a preceding counter value Cx2 stored in the car sharing device 34, the user authentication function unit 57 determines that the valid communication is performed and continues the process. If the present counter value Cx1 is less than or equal to the preceding counter value Cx2, the user authentication function unit 57 determines that the key information is possibly reused and terminates the connection of BLE communication.

Additionally, the user authentication function unit 57 performs terminal ID authentication to determine whether or not the terminal ID obtained in the authentication operation is valid. In the present example, the car sharing device 34 performs the terminal ID authentication by comparing the terminal ID obtained in the authentication operation (decryption process) with a terminal ID directly obtained from the mobile terminal 33. When the terminal ID authentication is accomplished, the user authentication function unit 57 determines that valid communication is performed and continues the process. When the terminal ID authentication is not accomplished, the user authentication function unit 57 determines that an incorrect terminal ID has possibly been obtained and terminates the connection of BLE communication.

The user authentication function unit 57 adjusts the time (date and time) of the timer 54 of the car sharing device 34 using the time information Tx obtained in the authentication operation. When the timer 54 includes, for example, a soft timer, the time of the timer 54 easily deviates, and the time resets when the battery is removed from the vehicle 1. Taking this point into consideration, the time information Tx sets the time of the timer 54 to the correct date and time.

When the present date and time obtained from the timer 54 is within the reservation time and BLE communication is in a connected state, the user authentication function unit 57 continues the process. When the present time obtained from the timer 54 is not in the reservation time or the BLE communication is disconnected, the user authentication function unit 57 forcibly terminates the process.

In step S211, the user authentication function unit 57 transmits the user authentication key to the mobile terminal 33. At this time, the user authentication key is encrypted by an encryption key (e.g., unique car sharing device encryption key) registered in the car sharing system 31 and is transmitted from the car sharing device 34 to the mobile terminal 33. Since the user authentication key is transmitted to the mobile terminal 33, the user authentication key may also be used in encryption communication that is later performed between the mobile terminal 33 and the car sharing device 34. The mobile terminal 33 decrypts the encrypted user authentication key received from the car sharing device 34 and stores the user authentication key in the memory 45.

In step S212, the sharing processing unit 47 transmits a key function validation request (key function control request). The key function validation request (key function control request) is encrypted by an encryption key registered in the car sharing system 31 and is transmitted to the car sharing device 34. The key function validation request is a request to validate the key function unit 56 of the car sharing device 34.

In step S213, the user authentication function unit 57 validates the key function unit 56 in response to the key function validation request. This allows the key function unit 56 of the car sharing device 34 to perform LF-UHF bidirectional communication with the verification ECU 9.

In step S214, the user authentication function unit 57 counts up a log of the key function validation.

In step S215, the user authentication function unit 57 transmits a key function validation report to the mobile terminal 33 as a key function control report illustrating the operation result of the key function control request. The key function validation report (key function control report) is encrypted by an encryption key registered in the car sharing system 31 and is transmitted to the mobile terminal 33. With the key function validation report, the mobile terminal 33 is reported that the key function unit 56 is validated. When the sharing processing unit 47 receives the key function validation report from the car sharing device 34, the sharing processing unit 47 shifts to an authentication completion state.

In step S216, the user authentication function unit 57 counts up a log of an authentication success of the key information Kd.

In step S217, the user authentication function unit 57 stores the key information Kd and the user authentication key in the memory 53 of the car sharing device 34. Then, the user authentication function unit 57 shifts to an authentication completion state. In the authentication completion state, the car sharing device 34 sets a rental flag (not illustrated) held in the memory 53 to a value indicating that the vehicle is in use. This allows the car sharing device 34 to perform operations such as locking and unlocking of the vehicle door 14 and starting of the engine 6.

Figure 5:
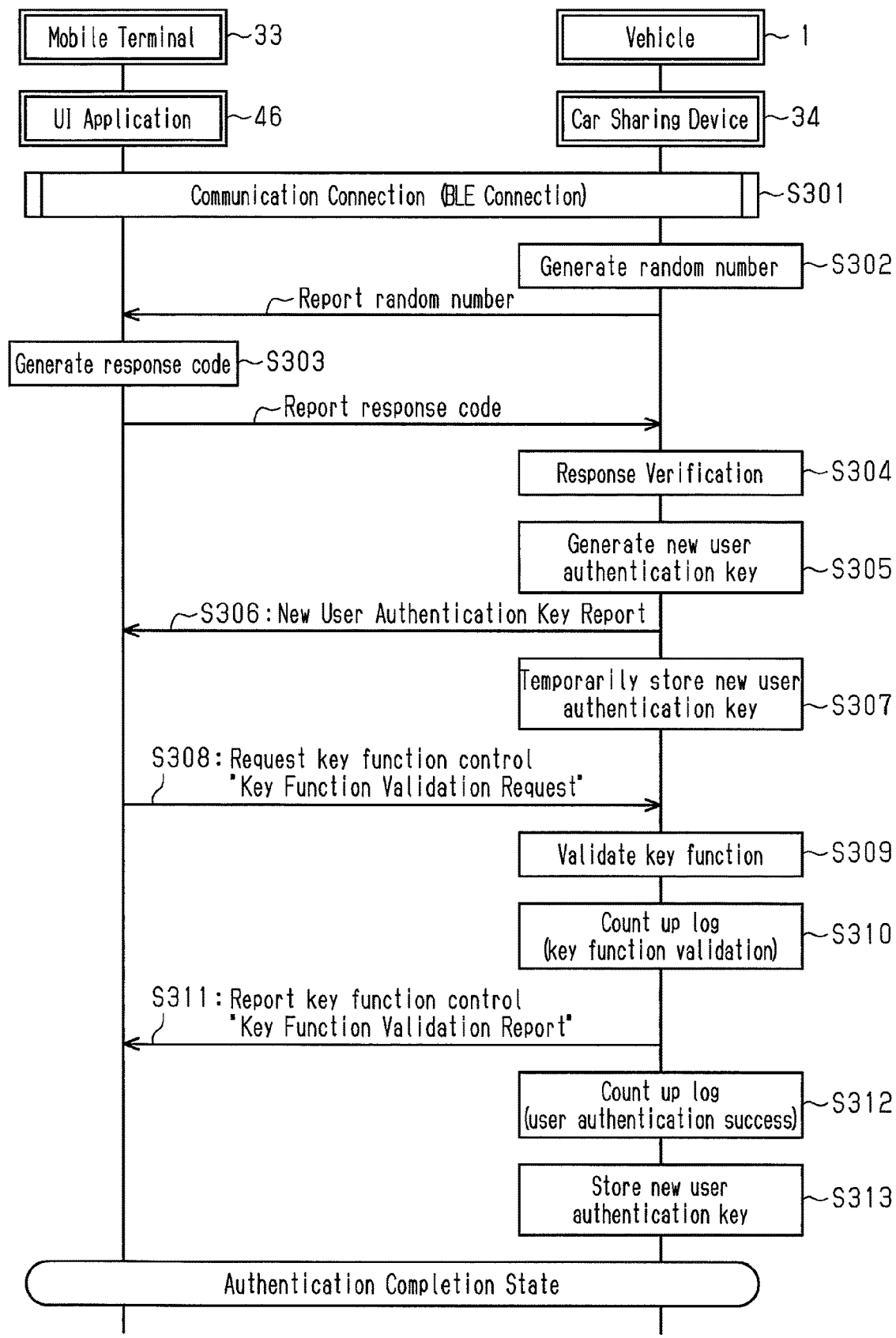
FIG. 5 is a flowchart illustrating a user authentication sequence.

FIG. 5 illustrates the user authentication sequence. The process in FIG. 5 is performed to shift the mobile terminal 33 and the car sharing device 34 to the "authentication completion state" when the vehicle 1 is operated (vehicle door is locked or unlocked, engine is started) with the mobile terminal 33 in which the key information Kd and the user authentication key are already registered.

In step S301, the sharing processing unit 47 and the user authentication function unit 57 perform communication connection to establish Bluetooth low energy (BLE) communication. The process of step S301 is the same as that of step S207 described above and thus will not be described in detail.

In step S302, the sharing processing unit 47 and the user authentication function unit 57 perform challenge-response authentication using an encryption key (hereafter, may also be referred to as old encryption key) that is already registered in the car sharing device 34. The old encryption key is an encryption key that was used in the preceding BLE communication. The old encryption key may be any encryption key that is already registered in the car sharing system 31. The user authentication function unit 57 generates a random number and transmits the random number to the mobile terminal 33.

In step S303, the sharing processing unit 47 generates a response code by encrypting the random number received from the car sharing device 34 with the old encryption key already registered in the mobile terminal 33. The sharing processing unit 47 transmits the generated response code to the car sharing device 34.

In step S304, the user authentication function unit 57 performs response verification that determines whether or not the response code received from the mobile terminal 33 is valid. The user authentication function unit 57 performs the response verification by generating a response code by encrypting a random number with the old encryption key already registered in the car sharing device 34 and comparing the generated response code with the response code that is obtained from the mobile terminal 33.

In step S305, when the response verification is accomplished, the user authentication function unit 57 generates a new user authentication key (hereafter, may also be referred to as new user authentication key). The new user authentication key may be generated from, for example, a random number, the value of which changes whenever generated.

In step S306, the user authentication function unit 57 transmits the generated new user authentication key to the mobile terminal 33. The new user authentication key is encrypted by an encryption key registered in the car sharing system 31 and is transmitted from the car sharing device 34 to the mobile terminal 33. The sharing processing unit 47 stores the new user authentication key received from the car sharing device 34 in the memory 45 of the mobile terminal 33.

In step S307, the user authentication function unit 57 temporarily stores the generated new user authentication key in the memory 53 of the car sharing device 34.

In subsequent steps S308 to S311, the same process as steps S212 to S215 described above is performed.

In step S312, the user authentication function unit 57 counts up a log of a user authentication success.

In step S313, the user authentication function unit 57 stores (formally registers) the generated new user authentication key in the memory 53. The mobile terminal 33 and the car sharing device 34 shift to the authentication completion state. During the sequence for exchanging the new user authentication key (in present example, steps S306 to S311), if the BLE connection is disconnected and reconnected, the response verification will be performed on both the old encryption key and the new user authentication key.

Figure 6:
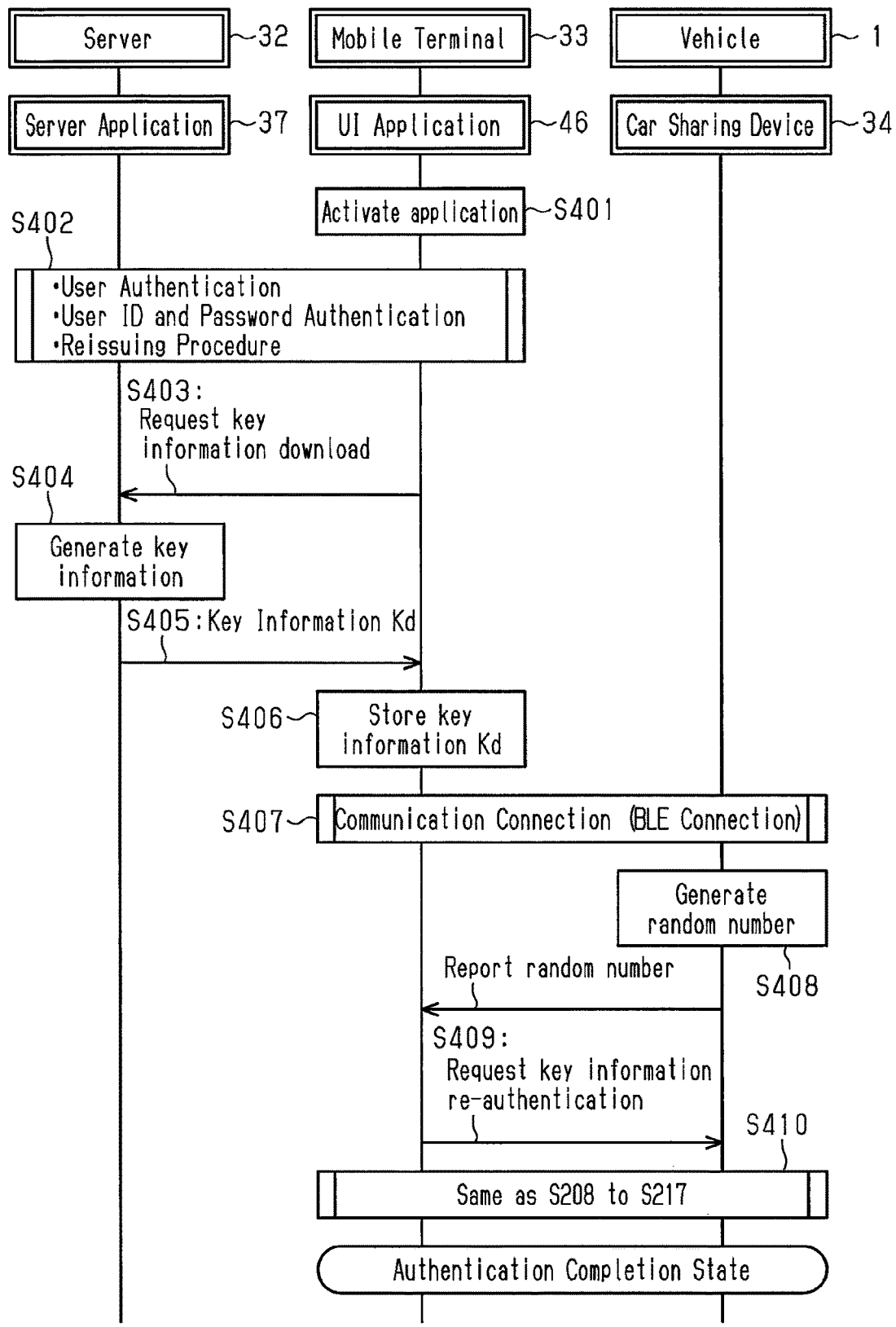
FIG. 6 is a flowchart illustrating a key information re-authentication sequence.

FIG. 6 illustrates the key information re-authentication sequence. This is performed when the user authentication key registered in the mobile terminal 33 is lost during the rental of the vehicle 1.

In step S401, for example, when the mobile terminal 33 is operated to start re-authentication of the key information Kd, the sharing processing unit 47 activates the user interface application 46.

In step S402, the key information generator 38 and the sharing processing unit 47 perform user authentication that checks the user performing the re-authentication of the key information Kd. In this user authentication, the user ID and password are authenticated, and a reissuing procedure is performed to regenerate the key information Kd, which was previously issued. The authentication of the user ID and password is performed in the same process as step S202 described above and thus will not be described in detail. When the authentication of the user ID and password is accomplished, the reissuing procedure is permitted. The reissuing procedure is an operation performed on the screen of the mobile terminal 33 to start the reissuing of the key information Kd (one-time key).

Then, in steps S403 to S406, the key information Kd is generated and stored through the same process as steps S203 to S206 described above.

In step S407, when the mobile terminal 33 is located near the vehicle 1, the sharing processing unit 47 and the user authentication function unit 57 establish BLE communication and perform the re-authentication of the key information Kd.

In step S408, the user authentication function unit 57 generates a random number used to perform challenge-response authentication using the encryption key already registered in the car sharing device 34. The process of step S408 is the same as the process of step S302 described above. The user authentication function unit 57 transmits the generated random number to the mobile terminal 33.

In step S409, the sharing processing unit 47 transmits a key information re-authentication request to the car sharing device 34 to request re-authentication of the key information Kd. At this time, the sharing processing unit 47 normally generates a response code from a random number received from the car sharing device 34. However, the user authentication key is lost, and the response code cannot be generated. Thus, the sharing processing unit 47 transmits the key information re-authentication request to the car sharing device 34.

In step S410, the user authentication function unit 57 performs a process for reporting the key information Kd to the mobile terminal 33 in response to the key information re-authentication request. The process of step S410 is the same as the process of steps S208 to S217 described above and thus will not be described in detail. When the process of step S410 is correctly completed, the mobile terminal 33 and the car sharing device 34 shift to the authentication completion state.

FIG. 7 illustrates the sequence of unlocking the vehicle door 14. When the vehicle door 14 is unlocked from the locked state with the mobile terminal 33, the user interface application 46 indicates an unlocking button 65 on the screen of the mobile terminal 33.

In step S501, when the sharing processing unit 47 determines that the unlocking button 65 on the screen of the mobile terminal 33 is operated in the authentication completion state, the sharing processing unit 47 transmits an unlocking request to the car sharing device 34 as a key operation request. The unlocking request, which requests the car sharing device 34 to unlock the vehicle door 14, is encrypted by a predetermined encryption key registered in the car sharing system 31 and is transmitted.

In step S502, the key function unit 56 transmits the unlocking request including the electronic key ID from the smart communication block 51 to the verification ECU 9 using UHF radio waves through the communication network (UHF communication) of the car sharing device 34.

In step S503, when the radio wave receiver 18 receives the unlocking request from the car sharing device 34, the verification ECU 9 transmits the unlocking request to the body ECU 10 through the communication line 12.

In step S504, in response to the unlocking request from the verification ECU 9, the body ECU 10 controls the door lock device 5 to change the vehicle door 14 from the locked state to the unlocked state. As a result, the vehicle door 14 is unlocked, allowing the user to enter the vehicle.

In step S505, the user authentication function unit 57 counts up a log of the unlocking request in response to the reception of the unlocking request from the mobile terminal 33.

In step S506, the user authentication function unit 57 transmits an unlocking transmission report to the mobile terminal 33 as a key control report. The unlocking transmission report indicates that the car sharing device 34 transmitted the unlocking request to the verification ECU 9. The unlocking transmission report is encrypted by a predetermined encryption key registered in the car sharing system 31 and is transmitted to the mobile terminal 33. When the unlocking transmission report is received from the car sharing device 34, the sharing processing unit 47 indicates the completion of the unlocking request transmission on the screen of the mobile terminal 33.

FIG. 8 illustrates the sequence of locking the vehicle door 14. When the vehicle door 14 is locked from the unlocked state with the mobile terminal 33, the user interface application 46 indicates a lock button 66 on the screen of the mobile terminal 33.

In step S511, when the sharing processing unit 47 determines that the lock button 66 on the screen of the mobile terminal 33 is operated in the authentication completion state, the sharing processing unit 47 transmits a lock request to the car sharing device 34 as a key operation request. The lock request, which requests the car sharing device 34 to lock the vehicle door 14, is encrypted by a predetermined encryption key registered in the car sharing system 31 and is transmitted.

In step S512, the key function unit 56 transmits the lock request including the electronic key ID from the smart communication block 51 to the verification ECU 9 using UHF radio waves through the communication network (UHF communication) of the car sharing device 34.

In step S513, when the radio wave receiver 18 receives the lock request from the car sharing device 34, the verification ECU 9 transmits the lock request to the body ECU 10 through the communication line 12.

In step S514, in response to the lock request from the verification ECU 9, the body ECU 10 controls the door lock device 5 to switch the vehicle door 14 from the unlocked state to the locked state. As a result, the vehicle door 14 is locked, and the vehicle 1 is in the park state.

In step S515, the user authentication function unit 57 counts up a log of the lock request in response to the reception of the lock request from the mobile terminal 33.

In step S516, the user authentication function unit 57 transmits a lock transmission report to the mobile terminal 33 as a key control report. The lock transmission report indicates that the car sharing device 34 transmitted the lock request to the verification ECU 9. The lock transmission report is encrypted with a predetermined encryption key registered in the car sharing system 31 and transmitted to the mobile terminal 33. When the lock transmission report is received from the car sharing device 34, the sharing processing unit 47 indicates the completion of the lock request transmission on the screen of the mobile terminal 33.

Figure 9:
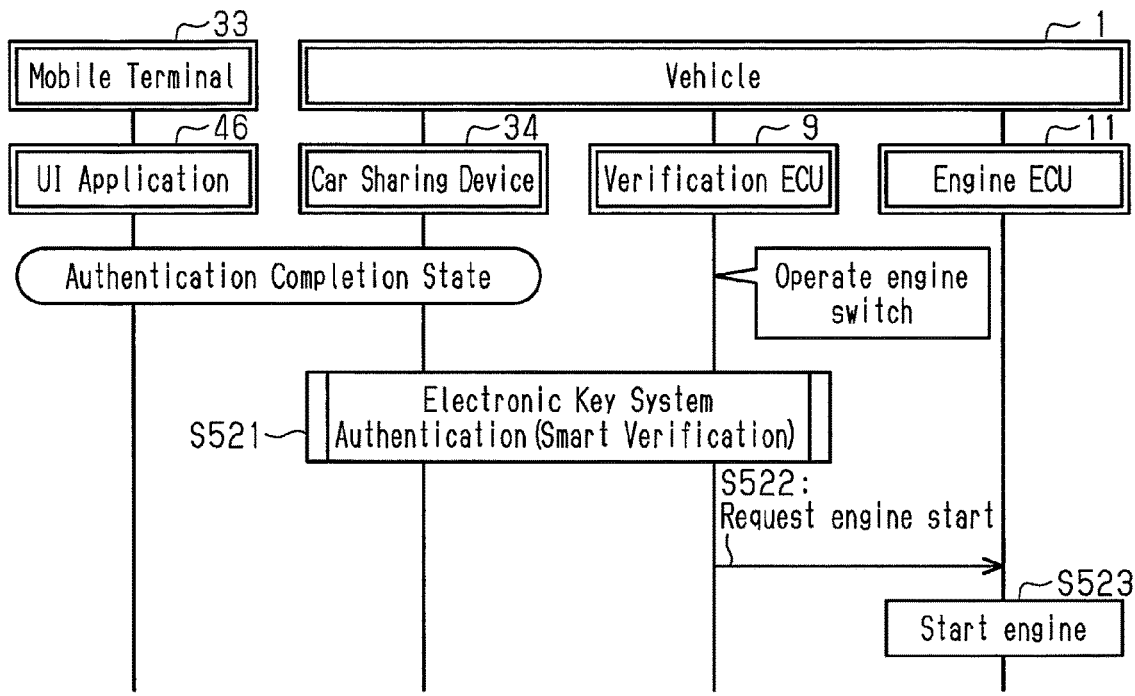
FIG. 9 is a flowchart illustrating a sequence of starting the engine of a vehicle.

FIG. 9 illustrates the sequence of starting the engine 6 of the vehicle 1. When starting the engine 6, for example, the user pushes the engine switch 28 located at the driver seat while performing a brake operation.

In step S521, when the verification ECU 9 determines that the engine switch 28 is operated with the brake operation, the verification ECU 9 performs smart communication with the key function unit 56 of the car sharing device 34 to perform ID verification (smart verification) of the car sharing device 34 in the same manner as the ID verification performed in the electronic key system 4. At this time, the verification ECU 9 transmits a wake signal from the interior transmitter 17 using LF radio waves. When the key function unit 56 receives the wake signal, if the car sharing device 34 is in the authentication completion state, the key function unit 56 performs smart verification (interior smart verification) through the communication with the verification ECU 9. In this smart verification, the verification ECU 9 and the key function unit 56 perform, for example, verification of the electronic key ID registered in the memory 53 of the car sharing device 34 and challenge-response authentication using the unique electronic key encryption key registered in the memory 53 in the same manner as the smart verification of the electronic key 2. When the verification ECU 9 determines that the smart verification is accomplished, the verification ECU 9 permits the engine 6 to start.

In step S522, the verification ECU 9 transmits an engine start request to the engine ECU 11 through the communication line 12.

In step S523, the engine ECU 11 starts the engine 6 in response to the engine start request from the verification ECU 9.

Figure 10:
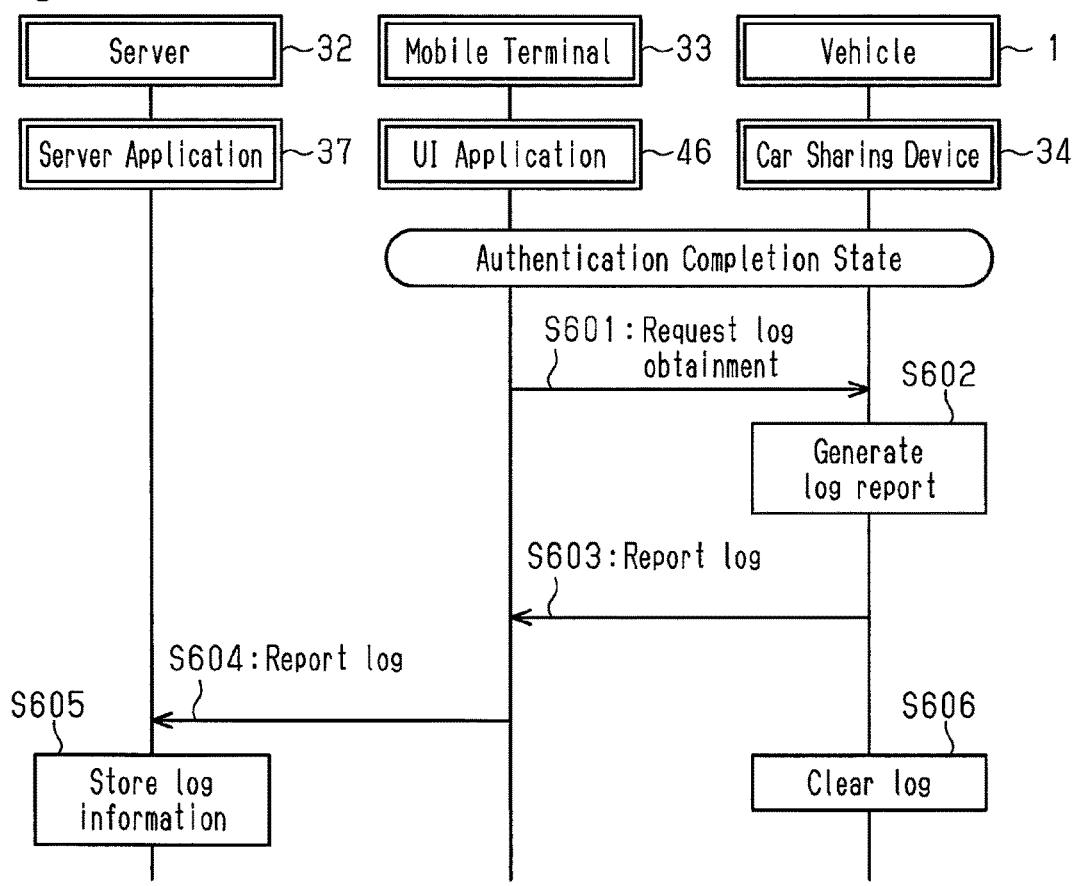
FIG. 10 is a flowchart illustrating a sequence of a log report process.

FIG. 10 illustrates the sequence of the log report process. In the present example, the mobile terminal 33 performs a log obtainment operation to obtain a log from the car sharing device 34 and forwards the obtained log to the server 32.

In step S601, when the sharing processing unit 47 detects a trigger for starting the log obtainment in the authentication completion state, the sharing processing unit 47 transmits the log obtainment request to the car sharing device 34. The log is obtained, for example, when the mobile terminal 33 is operated to start the obtainment or when an obtainment time regularly comes. The log obtainment request is encrypted by a predetermined encryption key registered in the car sharing system 31 and is transmitted.

In step S602, when the log obtainment request is received from the mobile terminal 33, the user authentication function unit 57 generates a log report based on log information stored in the car sharing device 34. The log report is a set of log information stored in the car sharing device 34 and is, for example, capable of reporting when and which kind (key function validation, key information authentication success, user authentication success, unlocking request, lock request, engine start, etc.) of log was stored.

In step S603, the user authentication function unit 57 transmits the log report to the mobile terminal 33. The log report is encrypted by a predetermined encryption key registered in the car sharing system 31 and transmitted to the mobile terminal 33.

In step S604, the sharing processing unit 47 forwards the log report from the car sharing device 34 to the server 32 through the network communication. The log report is encrypted by a predetermined encryption key registered in the car sharing system 31 and transmitted to the server 32.

In step S605, the server 32 stores the log information received by the log report from the mobile terminal 33 in a memory (e.g., database 39). As a result, the log (use state) of the shared vehicle 1 is stored in the server 32 as a record.

In step S606, after the log report is transmitted to the mobile terminal 33, the user authentication function unit 57 clears the log stored in the car sharing device 34. This avoids a situation in which the log remains in the car sharing device 34.

Figure 11:
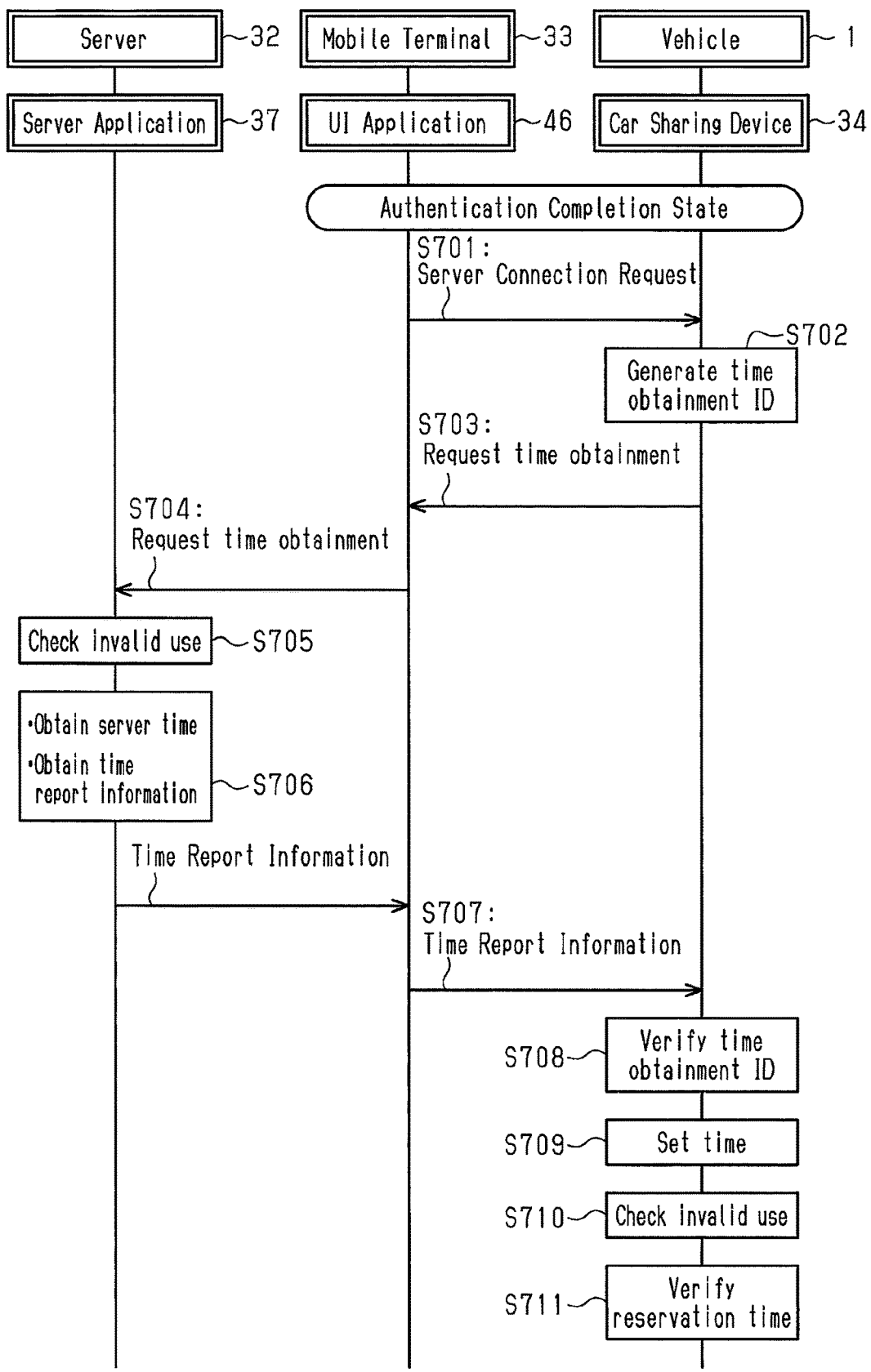
FIG. 11 is a flowchart illustrating a sequence of a server connection (connectable case)

FIG. 11 illustrates the sequence of the server connection (connectable state). The server connection is performed, for example, when the car sharing device 34 determines whether or not the use of the vehicle 1 is within the reservation time.

In step S701, when the serve connection time arrives in the authentication completion state, the sharing processing unit 47 transmits a server connection request (external device connection request) to the car sharing device 34. The server connection request is encrypted by a predetermined encryption key registered in the car sharing system 31 and is transmitted.

In step S702, the user authentication function unit 57 generates a time obtainment ID, which undergoes authentication when the server connection is performed. The time obtainment ID may be generated, for example, from a random number, the value of which changes in each transmission.

In step S703, the user authentication function unit 57 transmits a time obtainment request to the mobile terminal 33 to request the server 32 to provide the time information Tx. The time obtainment request is encrypted by a predetermined encryption key registered in the car sharing system 31 and is transmitted. The time obtainment request includes the time obtainment ID generated in the car sharing device 34 in addition to a command of the time obtainment request.

In step S704, the sharing processing unit 47 forwards the time obtainment request from the car sharing device 34 to the server 32 through the network communication.

In step S705, when the time obtainment request is received, the server 32 (server application 37) performs an invalid use check. The invalid use check checks for history of invalid use of the vehicle 1, for example, based on the log information and other reports stored in the server 32.

In step S706, the server 32 obtains a server time (date and time controlled in server 32) and generates the time information Tx based on the server time. Then, the server 32 generates time report information including the time information Tx and transmits the time report information to the mobile terminal 33. The time report information is encrypted by a predetermined encryption key registered in the car sharing system 31 and is transmitted. The time report information further includes the time obtainment ID received from the car sharing device 34 in addition to the time information Tx.

In step S707, the sharing processing unit 47 forwards the time report information from the server 32 to the car sharing device 34.

In step S708, the user authentication function unit 57 performs time obtainment ID verification by comparing the time obtainment ID generated in the user authentication function unit 57 with the time obtainment ID obtained from the server 32. At this time, when the time obtainment ID verification is accomplished, the user authentication function unit 57 continues the process. When the time obtainment ID verification is not accomplished, the user authentication function unit 57 forcibly terminates the process.

In step S709, the user authentication function unit 57 adjusts the time of the timer 54 based on the time report information obtained from the server 32.

In step S710, the user authentication function unit 57 performs the invalid use check. The invalid use check checks for history of invalid use of the vehicle 1, for example, based on the log information and other reports stored in the car sharing device 34.

In step S711, the user authentication function unit 57 performs reservation time verification based on the obtained time report information. In the present example, whether or not a condition that "reservation start time"≤"time of time report information"≤"reservation end time" is satisfied is determined. When the condition is satisfied, the user authentication function unit 57 determines that the reservation time verification is accomplished and continues the process. When the condition is not satisfied, the user authentication function unit 57 disconnects the communication (in the present example, BLE communication), invalidates the key function unit 56, clears the key information Kd, and sets the rental flag to an unused state.

Figure 12:
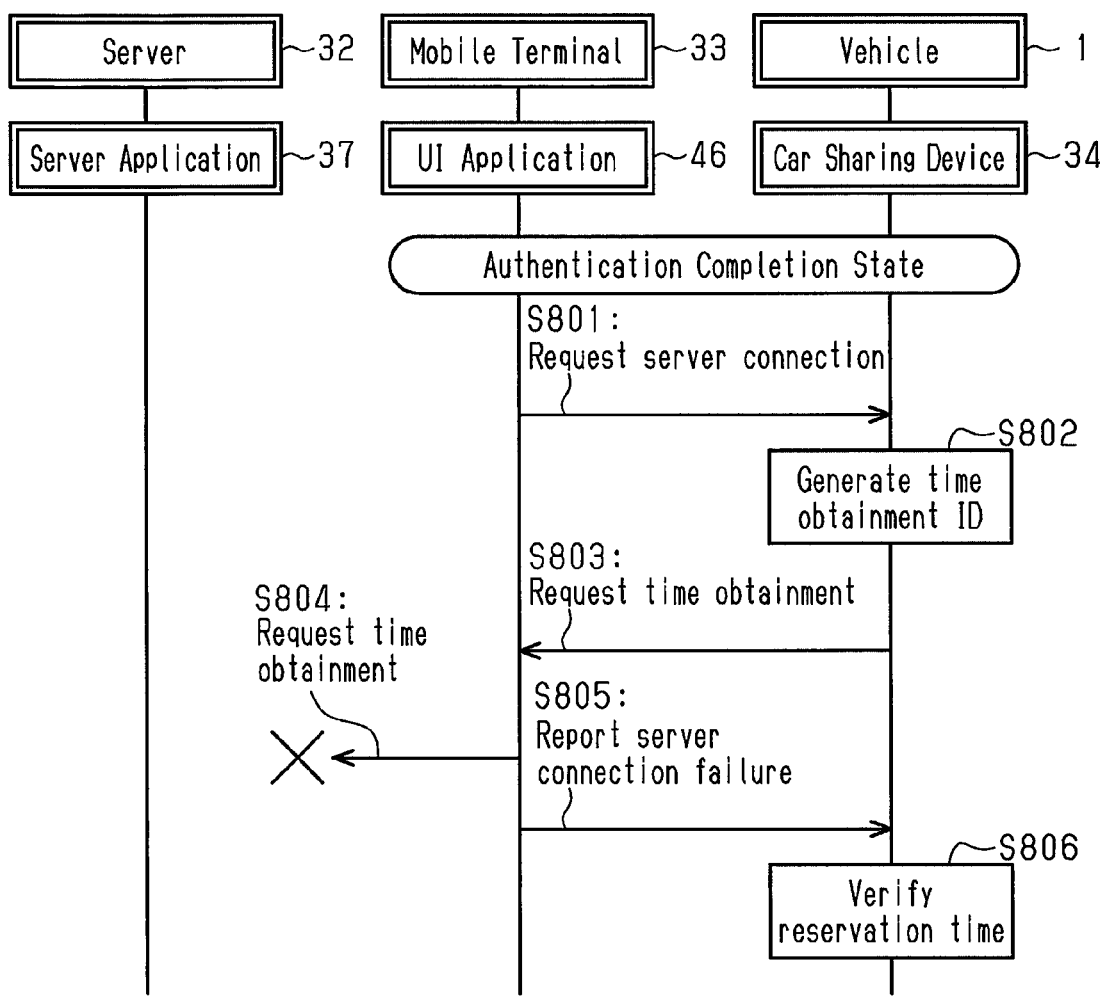
FIG. 12 is a flowchart illustrating a sequence of a server connection (non-connectable case)

FIG. 12 illustrates the sequence of the server connection (non-connectable case). The sequence is the process performed when the car sharing device 34 attempts to perform the server connection to obtain the time report information from the server 32 via the mobile terminal 33 but the server connection fails. Steps S801 to S804 are the same as steps S701 to S704 described above and thus will not be described in detail.

In step S805, when the sharing processing unit 47 transmits the time obtainment request to the server 32 but cannot receive the time report information in a predetermined time, the sharing processing unit 47 determines that the server connection failed. When the failure of the server connection is determined, the sharing processing unit 47 transmits a server connection failure report to the car sharing device 34 to report the failure. The server connection failure report is encrypted by a predetermined encryption key registered in the car sharing system 31 and is transmitted.

In step S806, the user authentication function unit 57 performs reservation time verification to determine whether or not the use is within the reservation time. If the time of the timer 54 is unset, the user authentication function unit 57 considers that the reservation time verification is accomplished. In this case, if the time of the timer 54 is within the reservation time taking account of a clock error of the timer 54, the user authentication function unit 57 determines that the reservation time verification is accomplished. If the time of the timer 54 is not within the reservation time taking account of the clock error, the user authentication function unit 57 determines that the reservation time verification is not accomplished. When the reservation time verification is not accomplished, the user authentication function unit 57 disconnects the communication (in the present example, BLE communication), invalidates the key function unit 56, clears the key information Kd, and sets the rental flag to the unused state. As described above, even when the server connection fails, the reservation time is checked based on the time of the timer 54. This improves the security.

Figure 13:
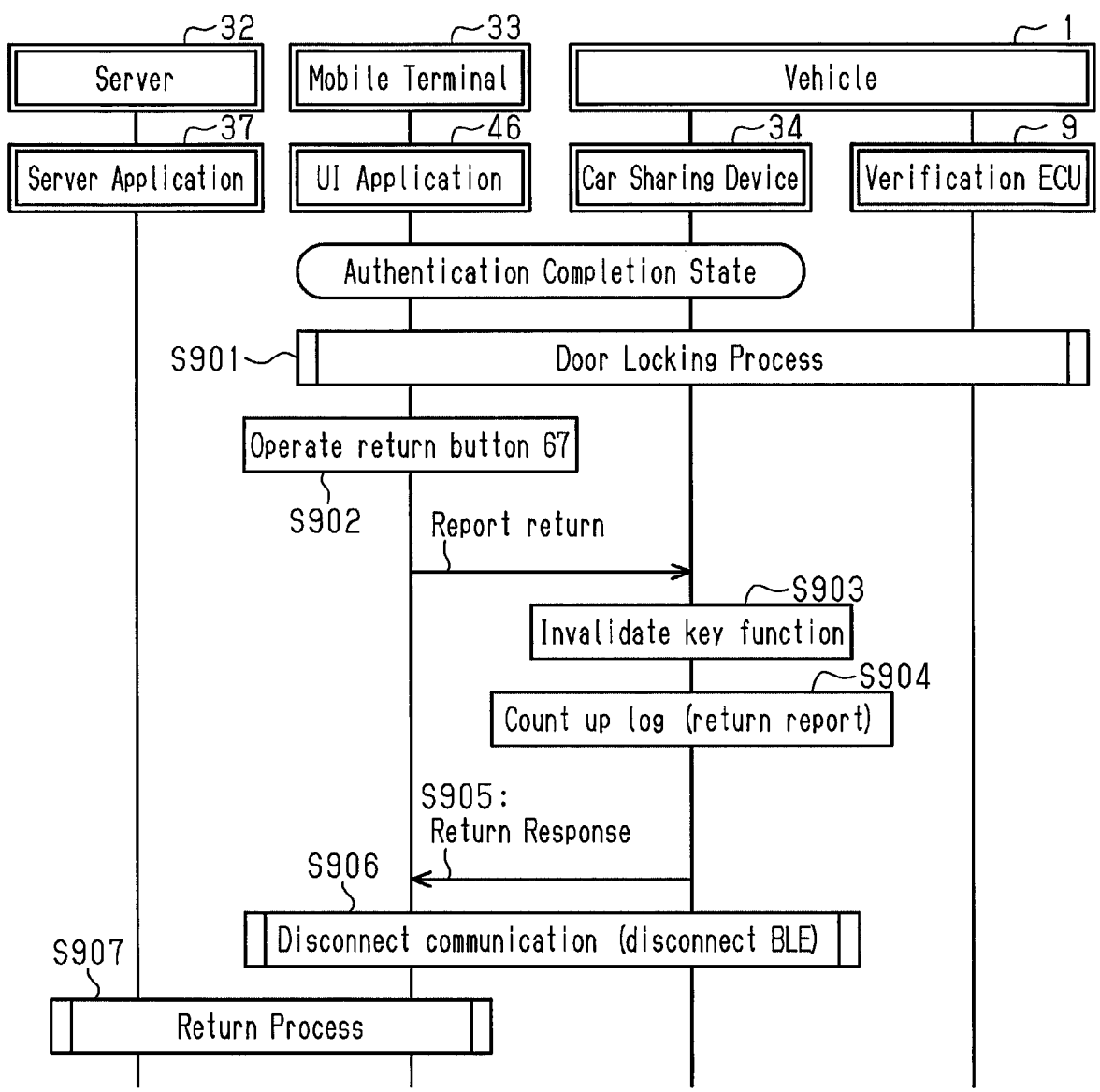
FIG. 13 is a flowchart illustrating a sequence of a vehicle return process.

FIG. 13 illustrates the sequence of returning the vehicle. The vehicle return is performed, for example, when a return button 67 is operated on the screen of the mobile terminal 33 after the vehicle door 14 is locked.

In step S901, the user performs a door locking process to lock the vehicle door 14. The door locking process is the process illustrated in steps S511 to S516 in FIG. 8 and thus will not be described in detail.

In step S902, after the locking process of the vehicle door 14 is performed, when the sharing processing unit 47 determines that the return button 67 on the screen of the mobile terminal 33 is operated, the sharing processing unit 47 transmits a return report to the car sharing device 34 to request the return of the vehicle 1. The return report is encrypted by a predetermined encryption key registered in the car sharing system 31 and is transmitted.

In step S903, when the return report is received from the mobile terminal 33, the user authentication function unit 57 invalidates the key function unit 56. This deactivates the key function unit 56 and disables smart communication.

In step S904, the user authentication function unit 57 counts up a log of the return report.

In step S905, the user authentication function unit 57 transmits a return response, indicating that the return of the vehicle 1 is accepted, to the mobile terminal 33 through BLE communication. The return response is encrypted by a predetermined encryption key registered in the car sharing system 31 and is transmitted.

In step S906, the sharing processing unit 47 disconnects the communication (BLE communication) in response to the return response from the car sharing device 34. The sharing processing unit 47 deletes the key information Kd and information (in the present example, user authentication key) related to the key information Kd from the memory 45 of the mobile terminal 33. As a result, the device 3 of the vehicle 1 cannot be operated with the mobile terminal 33.

In step S907, the mobile terminal 33 and the server 32 perform a return process. In the return process, the sharing processing unit 47 of the mobile terminal 33 notifies the server 32 that the vehicle 1 is returned. The server 32 (server application 37) determines that the rent vehicle 1 is returned.

The car sharing system 31 has the advantages described below.

In the car sharing system 31, when use of the vehicle 1 is reserved with the mobile terminal 33, the server 32 transmits the key information Kd, as reservation information, to the vehicle 1 via the mobile terminal 33. This eliminates the need for the vehicle 1 to have a function that communicates with the server 32. The vehicle 1 needs to include only the car sharing device 34 communicating with the mobile terminal 33. Thus, the configuration of the vehicle 1 is simplified. Additionally, the reservation information is transmitted to the mobile terminal 33 as the key information Kd (encrypted key information Kd) that needs to undergo authentication. Thus, the key information Kd is securely provided to the mobile terminal 33. Further, when the device 3 of the vehicle 1 is operated with the mobile terminal 33, the key function unit 56 of the car sharing device 34 operates the device 3 of the vehicle 1 by performing ID verification through a process similar to the electronic key 2 of the vehicle 1. This allows the car sharing device 34 to operate in the same manner as an electronic key of a versatile electronic key system and eliminates the need for constructing a new system from scratch. This also contributes to the simple configuration of the vehicle 1. Additionally, the user can practically use the mobile terminal 33 as a vehicle key. This eliminates the need for an IC card such as a membership card, for example, when the car sharing service is used, simplifying the car sharing system 31.

When a vehicle key is operated to start the engine 6 of the vehicle 1, the vehicle key may be kept in, for example, the glove compartment in the vehicle. In this case, since the vehicle key is located in the passenger compartment, theft of the vehicle key may result in an unauthorized use of the vehicle. This is undesirable in the viewpoint of security. In this regard, in the present example, the use of the mobile terminal 33 as the vehicle key eliminates the need for keeping the vehicle key in the passenger compartment and concern about the theft of the vehicle key.

The key information Kd is generated as a one-time key, which is permitted to be used only one time. This improves the security when the vehicle 1 is used.

The key information Kd is encrypted with the unique car sharing device encryption key, which is unique to the car sharing device 34. The key information Kd is transmitted through encryption communication. This improves the security when the key information Kd is provided to the car sharing device 34.

The key information Kd is generated in the server 32 that controls the sharing of the vehicle 1 through network communication. The key information Kd is securely generated in the server 32.

The encryption communication that is used by the key function unit 56 when ID verification is performed in the electronic key system 4 is functionally separated from the encryption communication that is performed between the user authentication function unit 57 and the mobile terminal 33 when the mobile terminal 33 operates the device 3 of the vehicle 1. Thus, even if an encryption key used in one of the encryption communications is stolen, the encryption key cannot be used in the other encryption communication. This further improves the security when the vehicle 1 is used.

The key information Kd includes the counter value Cx used to detect a reservation overlap. When the mobile terminal 33 operates the device 3 of the vehicle 1, the user authentication function unit 57 checks the counter value Cx of the key information Kd and determines whether or not to allow use of the vehicle 1. The number of times the key information Kd is generated is managed by the counter value Cx. This prevents reuse of the key information Kd.

The key information Kd includes the time information Tx, which reports the present date and time. The car sharing device 34 includes the timer 54 used to determine whether or not it is the reservation time. The user authentication function unit 57 adjusts the time of the timer 54 based on the time information Tx of the key information Kd. This takes measures to tampering with the time of the timer 54.

The key information Kd includes the terminal ID of the mobile terminal 33 used as a vehicle electronic key. The user authentication function unit 57 determines whether or not the mobile terminal 33 was used to reserve the vehicle 1 based on the terminal ID of the key information Kd. The terminal ID of the mobile terminal 33 is checked when the vehicle 1 is used. This further improves the security when the vehicle 1 is used.

When the user authentication key, which is used in encryption communication between the mobile terminal 33 and the car sharing device 34, is lost, the mobile terminal 33 reobtains the key information Kd from the server 32 and reregisters the user authentication key through the reissuing procedure of the key information Kd (process in FIG. 6). Thus, even when the user authentication key of the mobile terminal 33 is lost, the user authentication key is reregistered in the mobile terminal 33 through the reissuing procedure of the key information Kd.

The user authentication function unit 57 is capable of reporting the log related to the use of the vehicle 1 via the mobile terminal 33 to the server 32 (process in FIG. 10). The log may be checked to see the past use history of the vehicle 1. This allows a check for whether or not there is invalid use of the vehicle 1 in the past.

The user authentication function unit 57 transmits the time obtainment request to the mobile terminal 33 in response to the server connection request from the mobile terminal 33, adjusts the time of the timer 54 based on the time information Tx obtained from the server 32 via the mobile terminal 33, and determines whether or not the use of the vehicle 1 is within the reservation time based on the time information Tx (process in FIG. 11). Thus, whether or not the use of the vehicle 1 is valid is determined with high accuracy.

When the time information Tx cannot be obtained from the server 32 (when server connection fails), the user authentication function unit 57 determines whether or not the use of the vehicle 1 is within the reservation time based on the time that is presently held in the timer 54 (process in FIG. 12). Thus, even if the server connection fails, whether or not the use of the vehicle 1 is within the reservation time can be determined.

When the return operation of the vehicle 1 is performed, the mobile terminal 33 deletes the key information Kd and information related to the key information Kd from the memory 45 of the mobile terminal 33 (process in FIG. 13). Thus, after the vehicle 1 is used, the key information Kd and information related to the key information are deleted from the memory 45 of the mobile terminal 33. Thus, there will be no concern about theft of the information. At this time, the information in the memory 53 of the car sharing device 34 may also be deleted.

After the key information Kd obtained from the mobile terminal 33 is correctly decrypted, the user authentication function unit 57 allows the encryption communication using the user authentication key to be performed between the car sharing device 34 and the mobile terminal 33 (process in FIG. 4). This allows the encryption key to be switched during the communication from when the car sharing device 34 obtains the key information Kd from the mobile terminal 33 until the key function unit 56 of the car sharing device 34 is validated. The communication security is further improved.

In the communication performed with the mobile terminal 33 after the obtainment of the key information Kd, the user authentication function unit 57 performs authentication using the old encryption key, which was used in the preceding communication connection. When the authentication is accomplished, the user authentication function unit 57 replaces the old user authentication key with a new user authentication key (process in FIG. 5). Thus, the user authentication key is updated whenever the mobile terminal 33 performs communication to remotely operate the vehicle 1. This further improves the security when the vehicle 1 is used.

It should be apparent to those skilled in the art that the foregoing embodiments may be implemented in many other specific forms without departing from the scope of this disclosure. Particularly, it should be understood that the foregoing embodiments may be implemented in the following forms.

The key information Kd is encrypted by the unique car sharing device encryption key and provided to the car sharing device 34. Instead, the key information Kd may be encrypted by a different encryption key.

The contents of the key information Kd may be changed to contents different from the embodiment.

The authentication operation in step S210 is not limited to that described in the embodiment and may be changed to a different mode.

The key information Kd is generated in the server 32. Instead, the key information Kd may be generated in another external device.

In the engine start operation, for example, the screen of the mobile terminal 33 may display an "engine start" button. The button is operated to start the engine start operation.

In the electronic key system 4 (smart verification system), the exterior transmitter 16 and the interior transmitter 17 are used in the process for determining the position of the electronic key 2. Instead, for example, LF antennas may be located at the left and right sides of the vehicle body. The LF antennas transmit radio waves and check for a response from the electronic key 2 to determine whether the electronic key 2 is located inside or outside the vehicle.

The electronic key system 4 may be, for example, a wireless key system in which the performance of ID verification is triggered by communication from the electronic key 2.

The electronic key 2 is not limited to smartkey (registered trademark) and may be a wireless key.

Near-field wireless communication is not limited to Bluetooth communication and may be changed to another communication system.

The communication system and frequencies that are used in each communication are not limited to those described in the embodiment and may be changed to another system and other frequencies.

The ID verification performed in the electronic key system 4 is not limited to ID verification including challenge-response authentication. Any authentication and verification may be performed as long as at least the electronic key ID is verified.

The key information Kd is not limited to a one-time key and may be any key as long as the use of the key information Kd is restricted.

The encryption key used in the encryption communication may be, for example, any one of the unique car sharing device encryption key, the user authentication key, and the unique electronic key encryption key. The encryption key is not limited to those described in the embodiment.

For example, when the encryption key that is used is switched during a process, it is advantageous to improvement of the communication security.

The installation location of the car sharing device 34 is not particularly limited.

The mobile terminal 33 is not limited to a smartphone and may be changed to various terminals.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A car sharing system, comprising:
    a verification device arranged in a vehicle; and
    a car sharing device arranged in the vehicle, the car sharing device including
    a key function unit allowing a device of the vehicle that is shared with multiple people to operate by performing identification (ID) verification through wireless communication between the verification device and the car sharing device, wherein the identification (ID) verification is a process corresponding to identification (ID) verification performed to an electronic key of the vehicle, and
    a user authentication function unit, wherein
    when the device of the vehicle is operated with a mobile terminal, the user authentication function unit obtains key information from the mobile terminal and performs authentication of the key information, wherein the key information has been registered to the mobile terminal from an external device when the vehicle is reserved with the mobile terminal,
    when authentication of the key information is accomplished and use of the vehicle is within a reservation time, the user authentication function unit validates the key function unit, and
    the key information is generated as information that is permitted only for a temporary use.

2. The car sharing system according to claim 1, wherein the key information is generated as a one-time key permitted to be used only one time.

3. The car sharing system according to claim 1, wherein the key information is encrypted by a unique car sharing device encryption key that is unique to the car sharing device.

4. The car sharing system according to claim 1, wherein the external device includes a server that controls sharing of the vehicle through network communication, and
the key information is generated in the server.

5. The car sharing system according to claim 1, wherein encryption communication that is used when the key function unit performs the ID verification through an electronic key system is functionally separated from encryption communication that is performed between the user authentication function unit and the mobile terminal when the mobile terminal operates the device of the vehicle.

6. The car sharing system according to claim 1, wherein the key information includes a counter value used to detect a reservation overlap, and
when the mobile terminal operates the device of the vehicle, the user authentication function unit checks the counter value of the key information to determine whether or not to allow use of the vehicle.

7. The car sharing system according to claim 1, wherein the key information includes time information reporting present date and time,
the car sharing device includes a timer used to check the reservation time, and
the user authentication function unit adjusts time of the timer based on the time information of the key information.

8. The car sharing system according to claim 1, wherein the key information includes a terminal ID of the mobile terminal used as a vehicle electronic key, and
the user authentication function unit determines whether or not the mobile terminal was used to reserve use of the vehicle based on the terminal ID of the key information.

9. The car sharing system according to claim 1, wherein when a user authentication key used in encryption communication between the mobile terminal and the car sharing device is lost, the mobile terminal reobtains the key information from the external device through a procedure for reissuing the key information and reregisters the user authentication key.

10. The car sharing system according to claim 1, wherein the user authentication function unit is capable of reporting a log related to use of the vehicle to the external device via the mobile terminal.

11. The car sharing system according to claim 1, wherein the car sharing device includes a timer used to check the reservation time, and
the user authentication function unit is configured to
transmit a time obtainment request to the mobile terminal in response to an external device connection request from the mobile terminal,
adjust time of the timer based on time information obtained from the external device via the mobile terminal, and
determine whether or not use of the vehicle is within the reservation time based on the time information.

12. The car sharing system according to claim 11, wherein when the user authentication function unit cannot obtain the time information from the external device, the user authentication function unit determines whether or not use of the vehicle is within the reservation time based on time presently held in the timer.

13. The car sharing system according to claim 1, wherein the mobile terminal includes a memory storing the key information and information related to the key information, and
when a return operation of the vehicle is performed, the mobile terminal deletes the key information and information related to the key information from the memory.

14. A car sharing method, comprising:
providing key information that is permitted only for a temporary use to a mobile terminal from an external device, wherein the key information has been registered to the mobile terminal when a vehicle is reserved with the mobile terminal;
obtaining the key information from the mobile terminal with a user authentication function unit of a car sharing device included in the vehicle;
performing authentication of the key information with the user authentication function unit;
validating a key function unit of the car sharing device when authentication of the key information is accomplished and use of the vehicle is within a reservation time;
performing identification (ID) verification through wireless communication between a verification device arranged in the vehicle and the car sharing device, wherein the identification (ID) verification is a process corresponding to identification (ID) verification performed to an electronic key of the vehicle with the key function unit; and
allowing a device of the vehicle to operate when the ID verification performed with the key function unit is accomplished.

* * * * *